(12) United States Patent
Kogushi

(10) Patent No.: US 10,213,884 B2
(45) Date of Patent: Feb. 26, 2019

(54) AUTOMATED ASSEMBLY METHOD AND AUTOMATED ASSEMBLY APPARATUS

(71) Applicant: CANON KABUSHIKI KAISHA, Tokyo (JP)

(72) Inventor: Wataru Kogushi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 15/087,060

(22) Filed: Mar. 31, 2016

(65) Prior Publication Data

US 2016/0288281 A1    Oct. 6, 2016

(30) Foreign Application Priority Data

Mar. 31, 2015  (JP) .................................. 2015-070769
Mar. 14, 2016  (JP) .................................. 2016-049385

(51) Int. Cl.
   *B25J 15/00*         (2006.01)
   *B23P 21/00*         (2006.01)
   (Continued)

(52) U.S. Cl.
   CPC ........... *B23P 21/004* (2013.01); *B25J 9/0096* (2013.01); *B25J 9/023* (2013.01); *B25J 9/1687* (2013.01);
   (Continued)

(58) Field of Classification Search
   CPC ... B60B 33/006; B60B 33/02; A01D 41/1243; B62D 21/09; B25J 9/04; B25J 9/08; B25J 9/123; B25J 9/1005; B25J 9/144; B25J 9/1687; B25J 11/005; B25J 11/008; Y10T 29/49829
   See application file for complete search history.

(56) References Cited

U.S. PATENT DOCUMENTS

2009/0049681 A1  2/2009  Yagi et al.
2016/0089755 A1  3/2016  Kogushi et al.

FOREIGN PATENT DOCUMENTS

CN     101374404 A    2/2009
EP       0232548 A2   8/1987
(Continued)

OTHER PUBLICATIONS

European Search Report dated Sep. 23, 2016, in European Patent Application No. 16162752.6.
(Continued)

*Primary Examiner* — Sarang Afzali
*Assistant Examiner* — Ruth G Hidalgo-Hernandez
(74) *Attorney, Agent, or Firm* — Venable LLP

(57) ABSTRACT

An automated assembly apparatus, characterized by comprising an assembly robot having a plurality of hands, the plurality of hands being movable in an X-axis direction and a Y-axis direction by an X-axis moving unit and a Y-axis moving unit, and a plurality of workbenches which are provided with Z-axis moving unit and which are movable in a Z-axis direction by the Z-axis moving unit. A work area is independently provided for the plurality of workbenches, a width of a predetermined work area among the work areas is larger than clearance widths of the plurality of hands, widths of the work areas other than the predetermined work area are smaller than the clearance widths of at least some of the plurality of hands, and the hand which performs a job on the predetermined work area is disposed at a lowermost level in the Z-axis direction.

20 Claims, 6 Drawing Sheets

(51) Int. Cl.
*B25J 9/00* (2006.01)
*B25J 9/02* (2006.01)
*B25J 9/16* (2006.01)

(52) U.S. Cl.
CPC ......... *B25J 15/009* (2013.01); *B25J 15/0066* (2013.01); *Y10T 29/49829* (2015.01)

(56) References Cited

FOREIGN PATENT DOCUMENTS

| | | |
|---|---|---|
| EP | 0232548 A3 | 7/1989 |
| JP | 61142033 A | 6/1986 |
| JP | 8-323559 A | 12/1996 |
| JP | 2009072840 A | 4/2009 |
| WO | 2014037993 A1 | 3/2014 |
| WO | 2014/118820 A1 | 8/2014 |

OTHER PUBLICATIONS

Chinese Office Action issued in corresponding Chinese Application No. 201610180536.5 dated May 28, 2018.
European Search Report issued in corresponding European Application No. 18171993.1 dated Oct. 4, 2018.

AUTOMATED ASSEMBLY METHOD AND AUTOMATED ASSEMBLY APPARATUS

BACKGROUND OF THE INVENTION

Field of the Invention

The present invention relates to an automated assembly method that uses an automated assembly apparatus having an assembly robot with a plurality of hands, and an automated assembly apparatus.

Description of the Related Art

Conventionally, when performing a plurality of jobs by a single robot in an automated assembly apparatus, a tool changer has been used to change a hand. However, there has been a problem in that the use of the tool changer to change a hand or tool inconveniently takes time, resulting in an increased cycle time. Hence, there is a demand for a robot hand capable of performing a plurality of jobs while minimizing the changing time.

As a means for solving the aforesaid problem, Japanese Patent Application Laid-Open No. H08-323559 describes a robot hand apparatus having a single robot provided with three hands, namely, a swaging hand, a shaft chuck hand, and a gear chuck hand. The use of the means described in Japanese Patent Application Laid-Open No. H08-323559 enables a single robot to promptly perform a plurality of jobs.

However, the robot hand apparatus described in Japanese Patent Application Laid-Open No. H08-323559 is adapted to perform jobs by an articulated robot, which has one hand in a direction perpendicular to a tool adapter and two hands in a direction parallel thereto. This means that the robot hand apparatus does not enable an orthogonal robot to perform jobs. In addition, the hands have to be sufficiently spaced away from each other so as to prevent hands from interfering with a hand performing a job, thus resulting in an increased space required for performing jobs.

An object of the present invention is to solve problems that cannot be solved by conventional techniques and therefore to provide an automated assembly method and an automated assembly apparatus that enable an orthogonal robot to perform jobs, ensure no interference among hands, and permit higher space efficiency.

SUMMARY OF THE INVENTION

To this end, an automated assembly apparatus in accordance with the present invention includes:

an assembly robot having a plurality of hands, the plurality of hands being movable in an X-axis direction and a Y-axis direction by an X-axis unit and a Y-axis unit; and a plurality of workbenches which are provided with Z-axis units and which are movable in a Z-axis direction by the Z-axis units, wherein a work area is independently provided for the plurality of the workbenches, a width of a predetermined work area among the work areas is larger than clearance widths of the plurality of hands, the widths of the work areas other than the predetermined work area are smaller than the clearance widths of at least some of the plurality of hands, and the hand which performs a job on the predetermined work area is placed at a lowermost level in the Z-axis direction.

To this end, an automated assembly method in accordance with the present invention uses an automated assembly apparatus that includes an assembly robot having a plurality of hands which are movable in an X-axis direction and a Y-axis direction by an X-axis unit and a Y-axis unit, and a plurality of workbenches which are provided with Z-axis units and which are movable in a Z-axis direction by the Z-axis units, wherein the plurality of the workbenches has an independent work area, a width of a predetermined work area among the work areas is set to be larger than a width that permits entry of the plurality of hands, wherein the widths of the work areas other than the predetermined work area are set to be smaller than a width that permits entry of at least some of the plurality of hands, and a hand which performs a job on the predetermined work area is disposed at a lowermost level in the Z-axis direction among the plurality of hands, and wherein the assembly robot is moved in the X-axis direction and the Y-axis direction at above the work areas and the workbenches are moved in the Z-axis direction to perform assembly.

Further features of the present invention will become apparent from the following description of exemplary embodiments with reference to the attached drawings.

BRIEF DESCRIPTION OF THE DRAWINGS

FIG. 2A and FIG. 2B are side views of a plurality of hands in the embodiment of the present invention performing jobs, wherein FIG. 2A illustrates a transferring hand which is performing a job on a first workbench unit, and FIG. 2B illustrates an assembling hand performing a job on a supply unit.

FIG. 3A and FIG. 3B are schematic perspective views of workbench units in the embodiment of the present invention, wherein FIG. 3A is a schematic perspective view of a workbench unit capable of assembly from the directions of three planes, and FIG. 3B is a schematic perspective view of a workbench unit capable of assembly from the directions of five planes.

DESCRIPTION OF THE EMBODIMENTS

Figure 1:
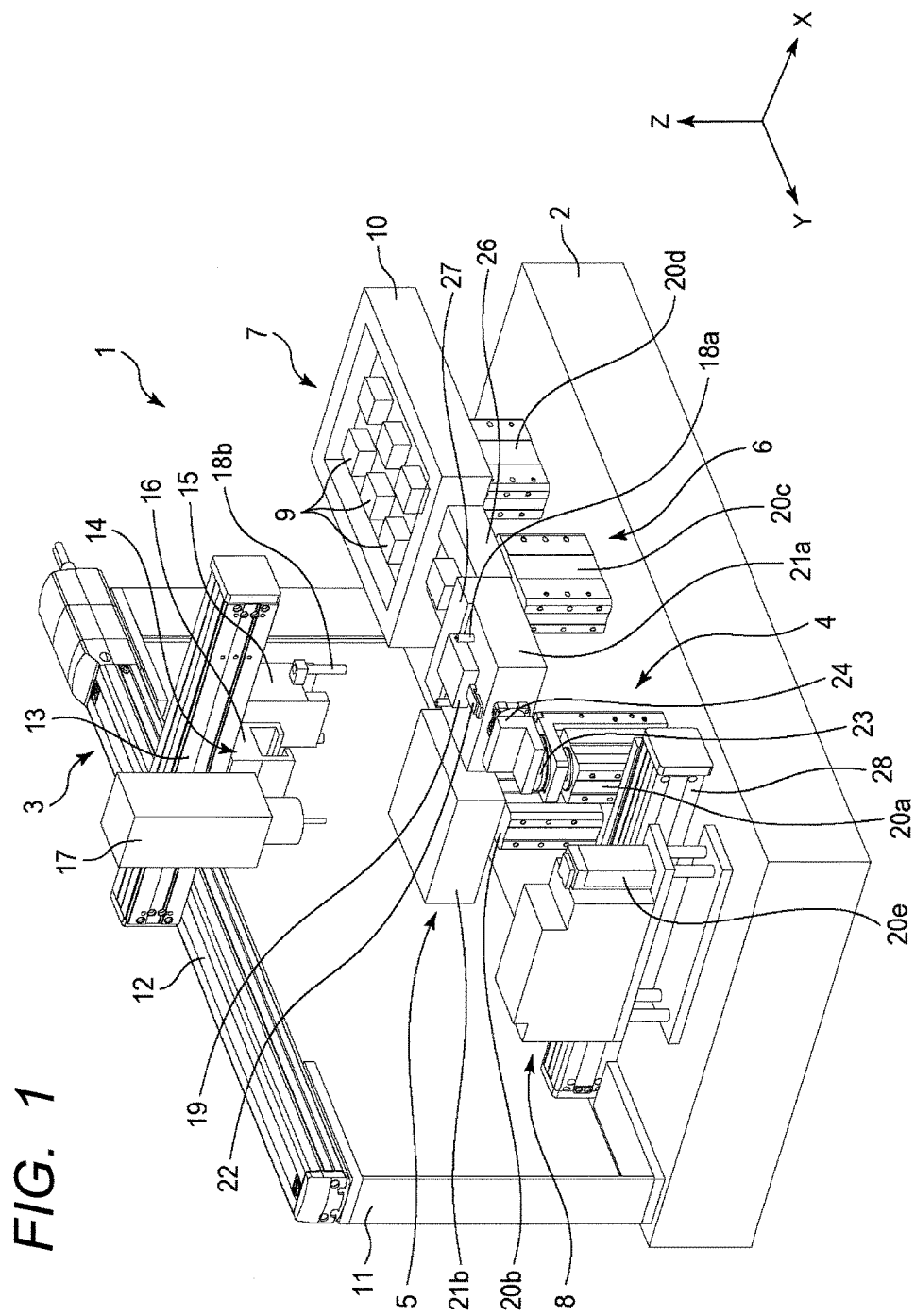
FIG. 1 is a schematic perspective view of an automated assembly apparatus for explaining an automated assembly method illustrating an embodiment of the present invention.

Preferred embodiments of the present invention will now be described in detail in accordance with the accompanying drawings.

An object of the present invention is to solve the problems that cannot be solved by conventional techniques, and the invention relates to an automated assembly method and an automated assembly apparatus which enable an orthogonal robot to perform jobs, ensure no interference among hands, and permit higher space efficiency.

Embodiments of the automated assembly method and the automated assembly apparatus will be described with reference to the accompanying drawings. In the drawings, like components will be assigned like reference numerals.

Embodiment

Referring to FIG. 1, a basic embodiment to which the present invention is applied will be specifically described below. FIG. 1 is a schematic perspective view of an automated assembly apparatus according to the present invention.

An automated assembly apparatus 1 includes an assembly robot 3, an assembly workbench unit 4, a loading workbench unit 5, a positioning unit 6, a supply unit 7, and a screw supply unit 8, each of which is disposed on a base 2 and movable in a horizontal plane.

The supply unit 7 has a supply tray 10 which accommodates at least one or more assembly components 9 such that the assembly components 9 can be supplied. The assembly components 9 on the supply tray 10 are picked up from the supply tray 10 and grasped by an assembling hand 15, which will be discussed hereinafter.

Each of the assembly workbench unit 4, the loading workbench unit 5, the positioning unit 6, the supply unit 7, and the screw supply unit 8 has an independent work area.

The assembling hand 15, a transferring hand 16, and a screw tightening unit 17 are disposed such that, when performing jobs in the work areas of the assembly workbench unit 4, the loading workbench unit 5, the positioning unit 6, and the screw supply unit 8, no other hands enter these work areas. However, the work area of the supply unit 7 has a width in the horizontal direction that allows other hands to enter while the assembling hand 15 is performing a job.

The assembly robot 3 includes a Y-axis mover (Y-axis moving unit) 12, which is provided on support columns 11 fixed on the base 2, and an X-axis mover (X-axis moving unit) 13 movably installed on the guide rail of the Y-axis mover 12. The assembly robot 3 does not have a drive unit in a Z-axis direction. The guide rail of the X-axis mover 13 is provided with a plurality of hands 14. The plurality of hands 14 include the assembling hand 15, the transferring hand 16, and the screw tightening unit 17, which are disposed in parallel in the Y-axis direction.

The assembling hand 15 has a through hole 18b as a guiding means that permits positioning relative to a workbench 21a, which will be discussed hereinafter. The X-axis and the Y-axis are substantially orthogonal to each other and lie in the same plane.

The assembly workbench unit 4 is a unit adapted to position and hold an assembly target component 19 in order to assemble the assembly component 9 to the assembly target component 19. The assembly workbench unit 4 is comprised of a carrier 28, a Z-axis mover (Z-axis moving unit) 20a, the workbench 21a, a work holder 22 for positioning and holding the assembly target component 19, a guide 18a, and a compliance mechanism (profiler) 23, which is movable in the X-axis direction, the Y-axis direction and a rotational direction.

The compliance mechanism (profiler) 23 has a locking and unlocking mechanism, which unlocks to enable the workbench 21a to move when positioning the workbench 21a relative to the assembling hand 15. The compliance mechanism 23 may be provided with a first rotator 24, which remains locked except for the positioning, thereby allowing the workbench 21a to rotate.

The loading workbench unit 5 is adapted to load the assembly target component 19 onto the automated assembly apparatus 1. The loading workbench unit 5 is capable of positioning and holding the assembly target component 19, as with the assembly workbench unit 4, and is comprised of a Z-axis mover 20b and a workbench 21b. The assembly workbench unit 4, which is a holding means, may be provided with an operating means that can be operated in the directions of a plurality of axes (two or more axes).

An operator places the assembly target component 19 on the workbench 21b, and positions and holds the assembly target component 19 by operating a control panel (not illustrated). Alternatively, the assembly target component 19 may be carried by a carrier (not illustrated) to the loading workbench unit 5.

The positioning unit 6 is adapted to perform highly accurate assembly by positioning the assembly component 9 in advance, and has a positioning table 26 placed on a Z-axis mover 20c. Disposed on the positioning table 26 is a positioner 27, which engages the assembly component 9 to set the phase of the rotational direction and the position in the XY-axis direction of the assembly component 9 with high accuracy.

The supply unit 7 is adapted to store and supply the assembly component 9, and has the supply tray 10 placed on a Z-axis mover 20d. A plurality of assembly components are placed in parallel on the supply tray 10, thus allowing the plurality of parts to be supplied. A plurality of types of assembly components may be placed in the supply tray 10. Further, a plurality of types of supply trays may be arranged to supply a plurality of types of parts. Further, the screw supply unit 8 is adapted to store and supply screws, and provided with a Z-axis mover 20e at the distal end thereof.

Figure 2A:
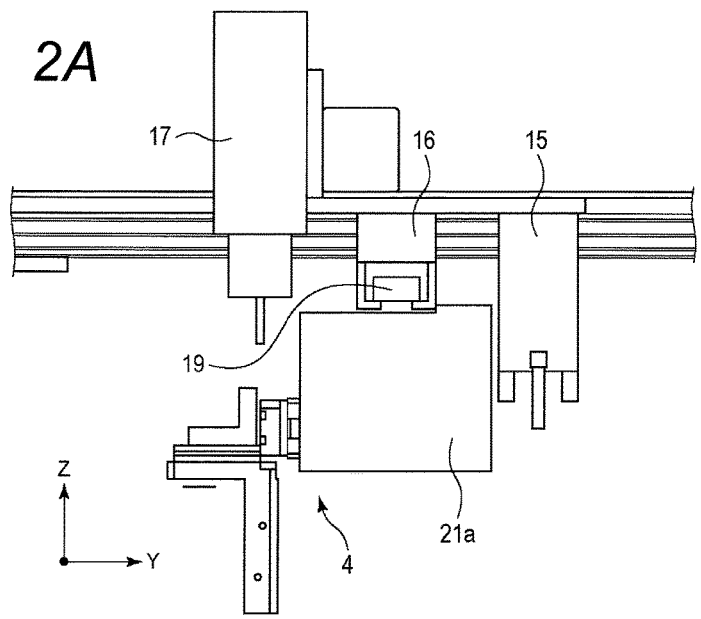
Figure 2B:
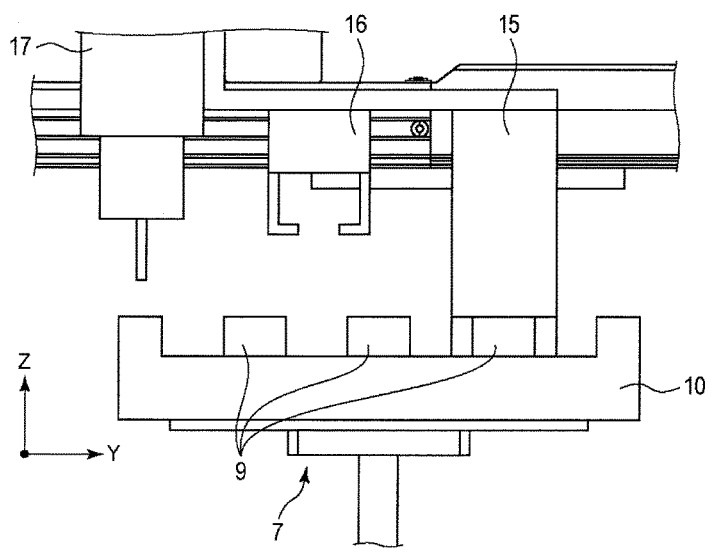

FIG. 2A and FIG. 2B illustrate the layout of the assembling hand 15, the transferring hand 16 and the screw tightening unit 17, which constitute the plurality of hands 14. FIG. 2A illustrates the transferring hand 16 in the process of transferring the assembly target component 19 from the workbench 21a of the assembly workbench unit 4.

Further, FIG. 2B illustrates the assembling hand 15 performing a job on the supply unit 7. The assembling hand 15 is mounted at the lowermost level in the Z-axis direction in relation to the transferring hand 16 and the screw tightening unit 17. As illustrated in FIG. 2B, the heights of the assembling hand 15, the transferring hand 16 and the screw tightening unit 17 are different from each other. Further, the heights are set such that the lowermost parts of the transferring hand 16 and the screw tightening unit 17 do not come in contact with the supply tray 10 when the assembling hand 15 performs a job on the assembly components 9 placed on the supply tray 10.

Figure 3A:
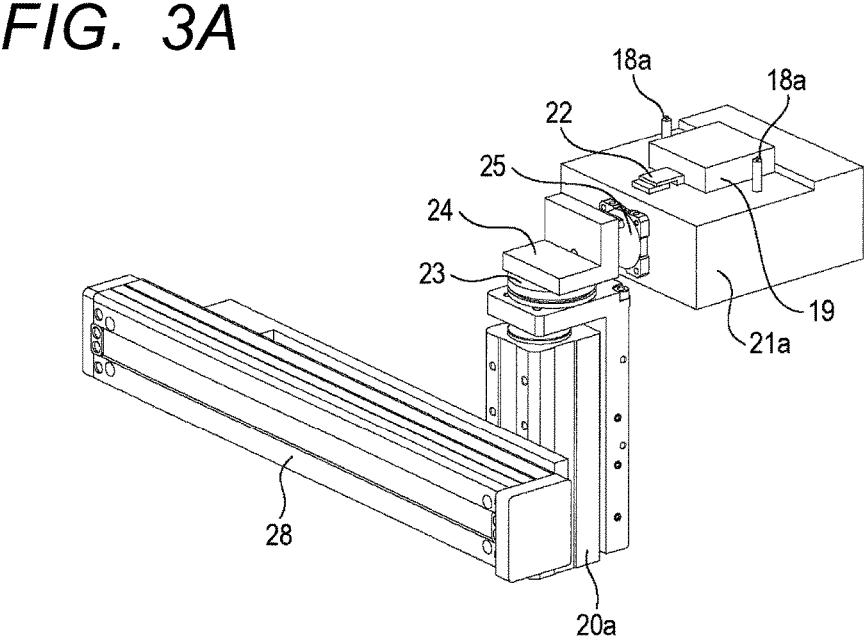
Figure 3B:
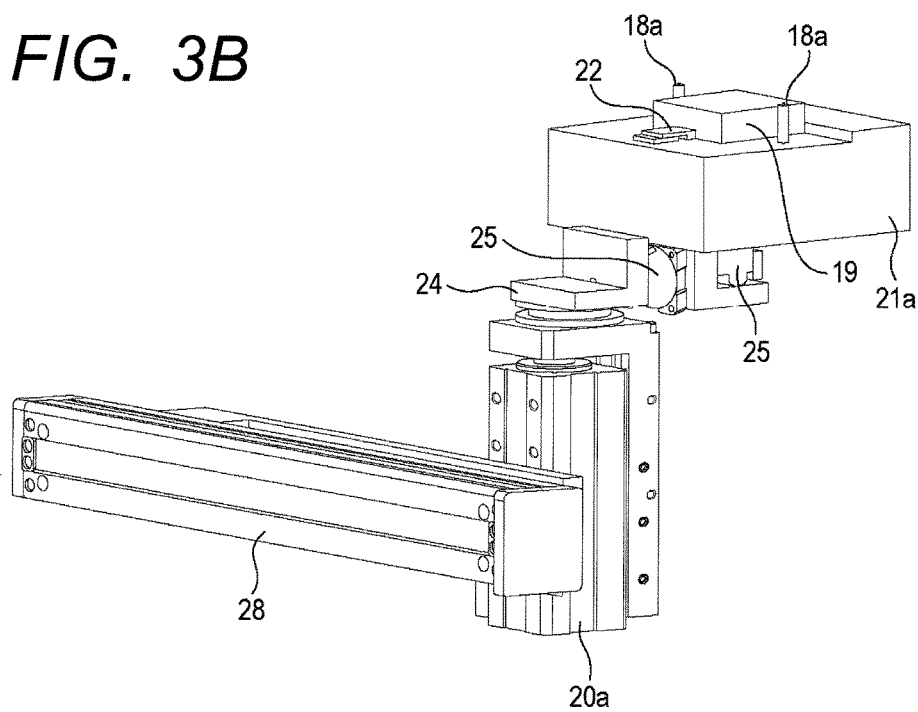

FIG. 3A and FIG. 3B are the schematic perspective views of the assembly workbench unit 4. FIG. 3A illustrates a state in which the assembly from three plane directions can be performed by the first rotator 24. Further, as illustrated in FIG. 3B, a second rotator 25 may be provided to permit the assembly from five plane directions.

A specific description will now be given of a series of operations of the automated assembly apparatus according to the embodiment of the present invention with reference to FIG. 1.

First, the assembly target component 19 is placed on the workbench 21b by an operator or a carrier (not illustrated).

After placing the assembly target component 19, the transferring hand 16 provided on the assembly robot 3 is moved onto the loading workbench unit 5 by operating the Y-axis mover 12 and the X-axis mover 13. After the movement of the transferring hand 16 onto the loading workbench unit 5 is completed, the Z-axis mover 20b provided on the loading workbench unit 5 ascends, and the transferring hand 16 grasps the assembly target component 19 placed on the workbench 21b.

When the assembly target component 19 is grasped, the Z-axis mover 20b descends. After the descent, the Y-axis mover 12 and the X-axis mover 13 are operated to move the transferring hand 16 provided on the assembly robot 3 onto the assembly workbench unit 4. After the movement of the transferring hand 16 onto the assembly workbench unit 4 is completed, the Z-axis mover 20a provided on the assembly workbench unit 4 moves up and the transferring hand 16 unchucks, i.e. clears grasping, thereby setting the assembly target component 19 on the workbench 21a. After the Z-axis mover 20a descends, the work holder 22 advances into position and retains the assembly target component 19.

Next, the Y-axis mover 12 and the X-axis mover 13 are operated to move the assembling hand 15 provided on the assembly robot 3 onto the supply unit 7. After the movement of the assembling hand 15 onto the supply unit 7 is completed, the Z-axis mover 20d provided on the supply unit 7 ascends, and after the ascent, the assembly component 9 placed in the supply tray 10 is grasped by the assembling hand 15.

After the supply unit 7 is moved down by operating the Z-axis mover 20d, the Y-axis mover 12 and the X-axis mover 13 are operated to move the assembling hand 15 onto the positioning unit 6. Following the completion of the movement of the assembling hand 15 onto the positioning unit 6, the Z-axis mover 20c provided on the positioning unit 6 ascends. After the ascent, the assembling hand 15 unchucks the assembly component 9, and places the assembly component 9 on the positioning table 26.

After the assembling hand 15 unchucks the assembly component 9, the positioner 27 advances to enhance the accuracy of the position in the XY direction and the phase direction of the assembly component 9. The assembly component 9 which has been positioned with higher accuracy is re-grasped by the assembling hand 15. The operation that involves the positioning unit 6 may be performed only when a high-accuracy assembling operation is required, and therefore may not be necessarily performed.

Upon the completion of the operation by the positioning unit 6, the Y-axis mover 12 and the X-axis mover 13 are operated to move the assembling hand 15 onto the assembly workbench unit 4. After the movement of the assembling hand 15 onto the assembly workbench unit 4 is completed, the compliance mechanism (profiler) 23 unlocks to enable the workbench 21a to move.

After the workbench 21a becomes movable, the workbench 21a is moved up by the Z-axis mover 20a provided on the assembly workbench unit 4. As the workbench 21a moves up, the pin-shaped guide 18a fits in the through hole 18b, thereby moving the workbench 21a by the compliance mechanism (profiler) 23 so as to be positioned with respect to the assembling hand 15.

With the workbench 21a positioned, the workbench 21a is further moved up to fit the assembly component 9 grasped by the assembling hand 15 onto the assembly target component 19 positioned and retained on the workbench 21a. After the fitting, the assembling hand 15 unchucks the assembly component 9, and the workbench 21a is moved down by the Z-axis mover 20a.

After the fitting of the assembly target component 19 and the assembly component 9, the Y-axis mover 12 and the X-axis mover 13 are operated to move the screw tightening unit 17 onto the screw supply unit 8. At the same time, a driver bit (not illustrated) in the screw tightening unit 17 is rotated by a motor (not illustrated) provided in the screw tightening unit 17.

After the completion of the movement of the screw tightening unit 17 onto the screw supply unit 8, the screw tightening unit 17 performs suction by a suctioner (not illustrated). As the Z-axis mover 20e ascends, the screw supply unit 8 ascends with a screw held at the distal end thereof and stops in the vicinity of the screw tightening unit 17 performing the suction. Then, the screw is handed to the screw tightening unit 17.

After the Z-axis mover 20e descends to move the screw supply unit distal end down, the Y-axis mover 12 and the X-axis mover 13 are operated to move the screw tightening unit 17 onto the assembly workbench unit 4. After the movement of the screw tightening unit 17 onto the assembly workbench unit 4 is completed, the workbench 21a is moved up by the Z-axis mover 20a provided on the assembly workbench unit 4. In the middle of the ascent, when the screw and the assembly target component 19 come in contact with each other, a torque change starts, and the torque reaches a maximum value upon the completion of tightening the screw. The instant the maximum value of the torque is detected, the motor (not illustrated) of the screw tightening unit 17 and the Z-axis mover 20a stop.

After assembling the assembly component 9 to the assembly target component 19 as described above, the assembly component 9 may be fixed to the assembly target component 19 by the screw tightening unit 17. Further, the screw tightening unit 17 and the screw supply unit 8 are necessary only when a screw tightening process is involved, and the screw tightening process is not necessarily carried out. Therefore, the screw tightening unit 17 and the screw supply unit 8 may be attached or detached, as necessary. Further, using the first rotator 24 and the second rotator 25 makes it possible to perform an operation for assembling the assembly component 9 to the assembly target component 19 in a plurality of directions or to perform a fixing operation, such as tightening screws.

When the assembly component 9 is fitted or connected to the assembly target component 19 and the assembly process on the automated assembly apparatus 1 is finished, the carrier 28 provided on the assembly workbench unit 4 is operated to discharge the assembly target component 19 set on the workbench 21a out of the automated assembly apparatus 1.

Figure 4:
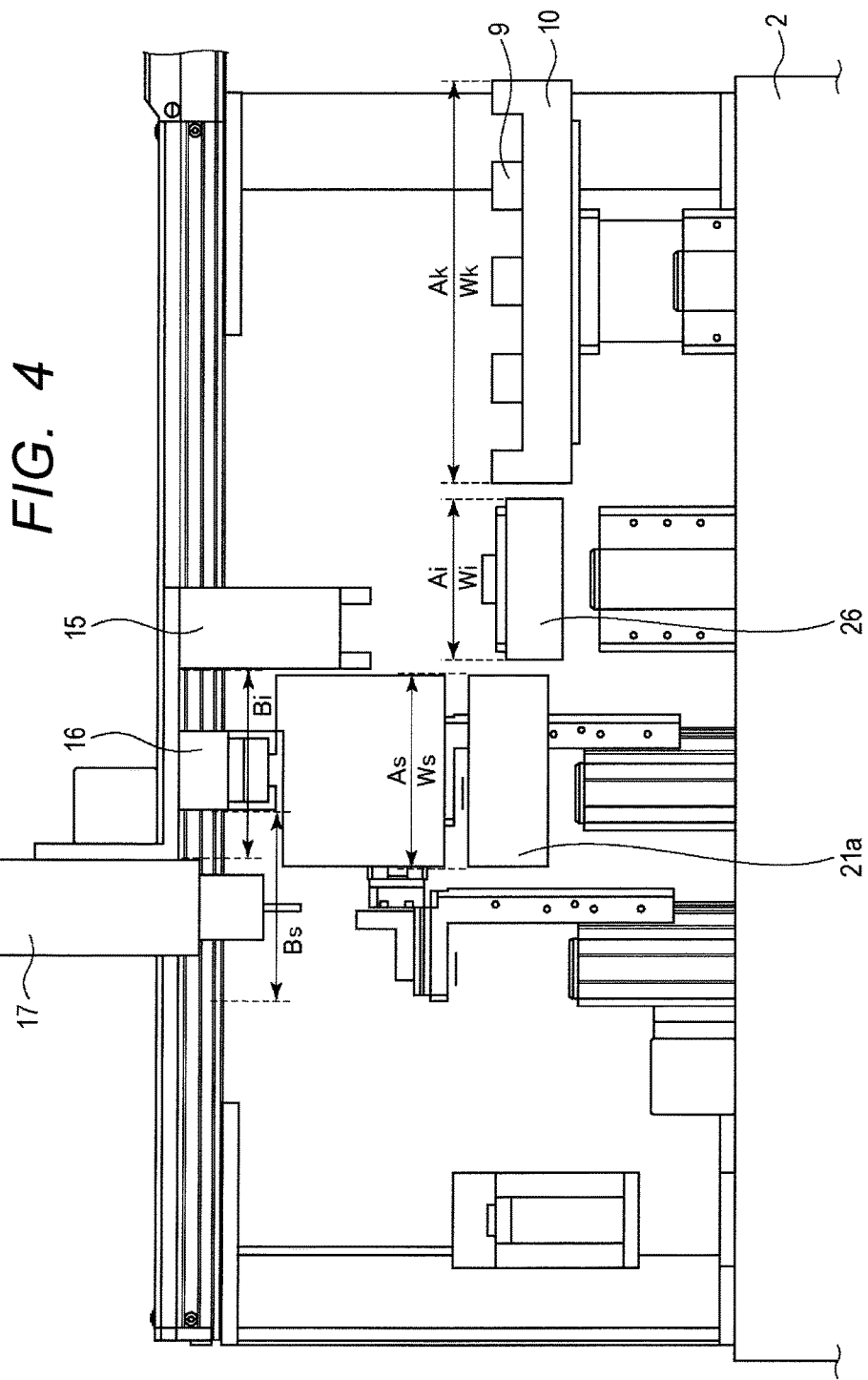
FIG. 4 is a schematic side view of the automated assembly apparatus, illustrating the relationship between the width of each hand and each work area in a horizontal direction.
Figure 5:
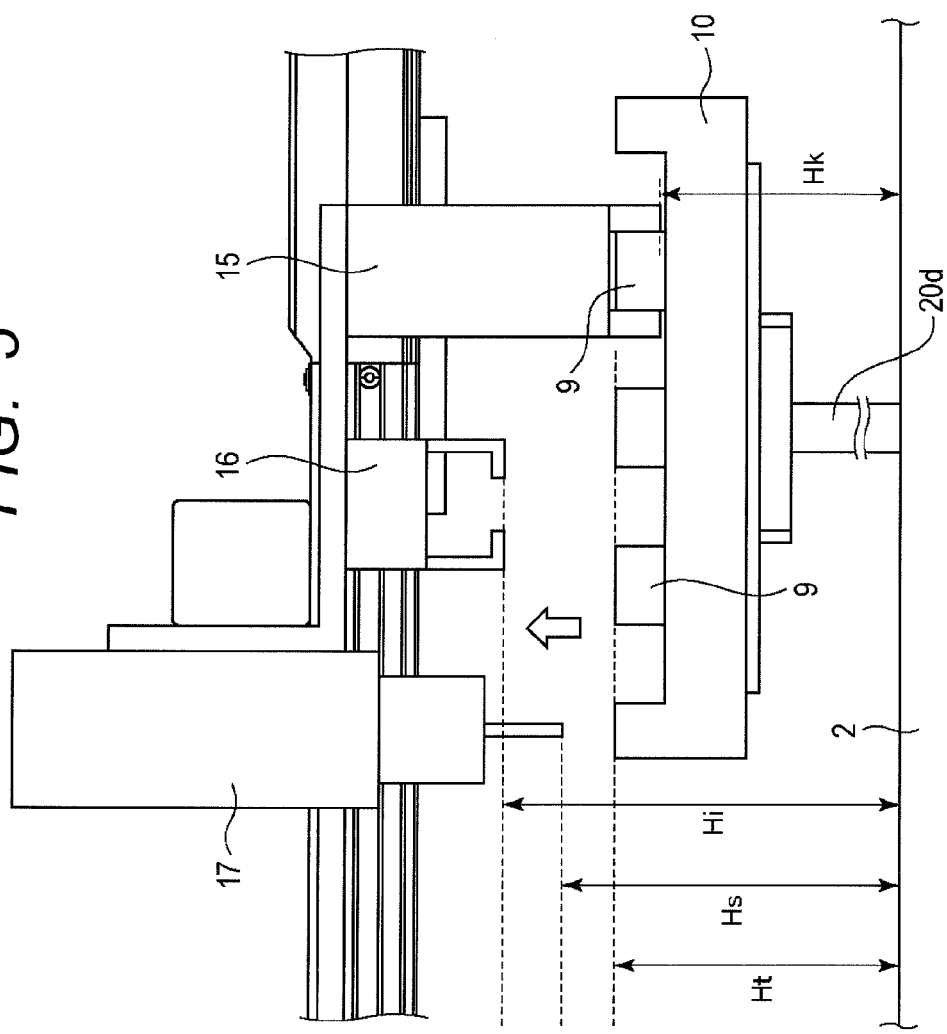
FIG. 5 is a schematic side view of the automated assembly apparatus, illustrating the relationship between each hand and a supply tray in a vertical direction.

Referring now to FIG. 4 and FIG. 5, a description will be given of the relationship between the width of each hand and each work area in the horizontal direction and the relationship between each hand and the supply tray in the vertical direction. FIG. 4 is a schematic side view of the automated assembly apparatus, illustrating the relationship between the width of each hand and each work area in the horizontal direction. Further, FIG. 5 is a schematic side view of the automated assembly apparatus, illustrating the relationship between each hand and the supply tray in the vertical direction.

Referring to FIG. 4, a work area As of the workbench 21a of the assembly workbench unit 4, a work area Ai of the positioning table 26, and a work area Ak of the supply tray 10 are provided as illustrated in the drawing. Further, the transferring hand 16 and the screw tightening unit 17 constituting the plurality of hands 14 have clearance widths Bi and Bs, respectively, for entering the work areas.

In FIG. 4, the sizes of widths Ws, Wi and Wk of the work areas As, Ai and Ak denote the sizes in the horizontal direction (the Y-axis direction in this case). The clearance widths Bi and Bs of the hands also denote the sizes in the horizontal direction.

The relationship between the width of each work area and the clearance width of each hand is denoted as shown below.

$$Ws<Bs, Ws<Bi \quad (1)$$

$$Wi<Bs, Wi<Bi \quad (2)$$

$$Wk>Bs, Wk>Bi \quad (3)$$

As indicated by (1) and (2) above and FIG. 4, the work area As of the workbench 21a and the work area Ai of the positioning table 26 are set to be slightly smaller than the clearance width Bs and the clearance width Bi. Thus, the transferring hand 16 and the screw tightening unit 17 cannot, enter together, the work areas As and Ai, but can enter, together, r the work area Ak of the supply tray 10.

As described above, the widths of the work areas other than a predetermined work area are set to be smaller than the clearance widths of at least some of the plurality of hands, and the width of the predetermined work area among the work areas is set to be larger than the clearance widths of the plurality of hands, as indicated by (3) above.

Thus, according to the present invention, if, for convenience, the width of a predetermined work area is denoted by Wx (Wk), the widths of the work areas other than the predetermined work area are denoted by Wy, and the width that allows the plurality of hands to enter is denoted by Bx, then a relationship expressed by Wx>Bx and Wy<Bx is satisfied.

As described above, the widths of the work areas other than a predetermined work area (the work area of the supply tray in the present embodiment) are set to widths that block the entry of at least some of the plurality of hands. Hence, the width of each workbench (work area) is adjusted to the width of each hand, so that each hand can be disposed with smaller intervals. This provides an advantage of improved space efficiency.

If the predetermined work area is the supply tray 10, on which the plurality of assembly components 9 are placed in parallel to be supplied to the assembling hand 15, then the assembly components 9 on the supply tray 10 are grasped and transferred by the assembling hand 15 as the predetermined hand. At this time, the assembling hand 15 is disposed at the lowermost level in the Z-axis direction.

Referring now to FIG. 5, the relationship between each hand and the supply tray in the vertical direction, i.e. the Z-axis direction, will be described. The uppermost part of the supply tray 10 is movable from the base 2 up to a height Ht by the Z-axis mover 20d. Meanwhile, the heights of the lowermost parts of the assembling hand 15, the transferring hand 16 and the screw tightening unit 17, which do not descend themselves, from the base 2 are denoted by Hk, Hi and Hs.

The height relationship between each hand and the supply tray 10 (the relationship in the vertical direction) is expressed as follows.

$$Ht>Hk \quad (1)$$

$$Ht<Hi, Ht<Hs \quad (2)$$

Before the assembling hand 15 moves onto the supply tray 10, the supply tray 10 is positioned at a level that is lower than the height Hk so as not to interfere with the movement of the assembling hand 15. When the assembling hand 15 reaches the position where the assembly component 9 on the supply tray 10 can be grasped, the assembling hand 15 is controlled by a controller (not illustrated) to move up to the height Ht.

Thus, if, for convenience, the height of a hand that performs a job on a predetermined work area is denoted by Hx, the heights of other hands are denoted by Hy, and the height at which the uppermost part of the predetermined work area has ascended most is denoted by Hz, then the relationship expressed by Hx<Hz and Hy>Hz is satisfied.

As seen from FIG. 5, among the plurality of hands having different heights, the assembling hand 15, which performs a job on a first work area, is disposed at the lowermost level in the Z-axis direction. This makes it possible to avoid interference without increasing the intervals among the plurality of hands, so that the hands can be disposed with smaller intervals in the width direction, thus enabling an orthogonal robot to perform jobs. Further, each workbench independently moves up and down, so that the workbenches can be disposed with smaller intervals thereamong, resulting in higher space efficiency of the entire apparatus.

Figure 6:
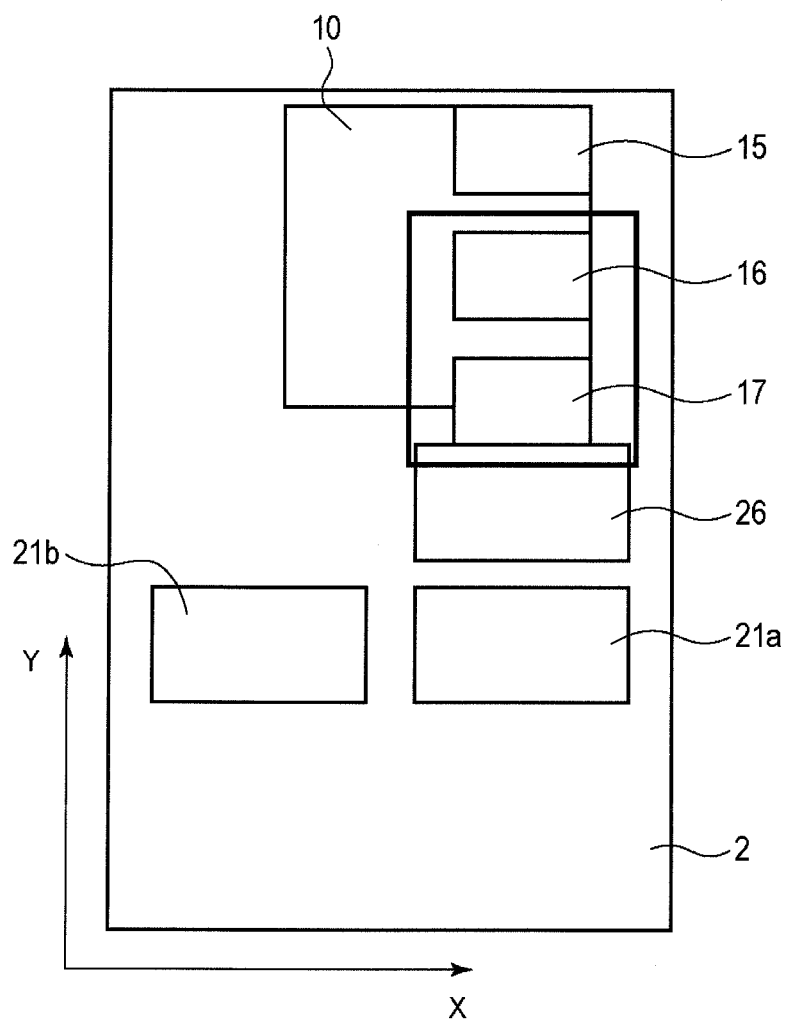
FIG. 6 is a schematic top view of the automated assembly apparatus, illustrating the relationship of entry in the horizontal direction between each work area and each hand.

FIG. 6 is a schematic plan view of the automated assembly apparatus, illustrating the relationship between each work area and the entry of each hand in the horizontal direction. The drawing illustrates the assembling hand 15 performing a job on the supply tray 10. At this time, the assembly robot 3 provided with the plurality of hands enters the work area in the XY-axis direction of the supply tray 10.

The work area Ak of the supply tray 10, which is the first work area, has the width Wk in the horizontal direction that allows the other hands, namely, the transferring hand 16 and the screw tightening unit 17, to enter while the assembling hand 15 is working in the work area Ak. Hence, as illustrated in FIG. 6, the plurality of hands, namely, the assembling hand 15, the transferring hand 16 and the screw tightening unit 17, can enter the work area Ak.

Meanwhile, an arrangement is made such that, while one of the assembling hand 15, the transferring hand 16, and the screw tightening unit 17 performs a job in a work area other than the work area Ak of the supply tray 10, other hands do not enter the particular other work area.

According to the configuration and the operations described above, the width of the work area other than the supply unit 7 is the width that prohibits an adjacent hand from entering the work area. Further, the assembling hand 15 is placed at the lowermost level in the Z-axis direction with respect to the other hands so as to allow the hands to be disposed with smaller intervals in the width direction. Further, each of the workbenches independently moves up and down, so that the work areas can be disposed with smaller intervals thereamong, resulting in higher space efficiency of the entire automated assembly apparatus.

Further, the plurality of assembly components 9 are placed in parallel on the supply tray 10, and the supply tray 10 moves up and down in the Z-axis direction, so that a plurality of parts can be supplied with the parts retained in the supply tray. This obviates the need for an additional transferring mechanism, thus permitting a simplified supply system.

The automated assembly apparatus in accordance with the present invention provides the following advantages.

In the automated assembly apparatus in accordance with the present invention, among the work areas of the plurality of workbenches, the width of a predetermined work area is set to be larger than the clearance widths of the plurality of hands, and the widths of the work areas other than the predetermined work area are set to be smaller than the clearance widths of at least some of the plurality of hands.

Further, the hand performing a job on a predetermined work area is disposed at the lowermost level in the Z-axis direction. Hence, the interference among the plurality of hands can be avoided without increasing the intervals thereamong, so that the hands can be disposed with smaller intervals in the width direction, and jobs can be performed by an orthogonal robot. Further, since each workbench independently moves up and down, the workbenches can be disposed with smaller intervals, resulting in higher space efficiency of the entire apparatus.

Further, in the automated assembly apparatus according to the present invention, a plurality of parts are placed in parallel on the tray and the supply parts on the tray are grasped and transferred by a first hand. Hence, a plurality of parts can be supplied with the parts held in the tray, thus permitting a simplified supply system by eliminating the need for a transferring mechanism even when an orthogonal robot is used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-070769, filed Mar. 31, 2015, and Japanese Patent Application No. 2016-049385, filed Mar. 14, 2016, which are hereby incorporated by reference herein in their entirety.

What is claimed is:

1. An automated assembly apparatus, comprising:
an assembly robot having a first hand and a second hand, the first hand (i) being provided at a position lower than the second hand in a Z-axis direction and (ii) being arranged to perform a predetermined job, the assembly robot being capable of moving the first hand and the second hand in an X-axis direction and a Y-axis direction by an X-axis moving unit and a Y-axis moving unit; and
a first workbench and a second workbench which are movable in the Z-axis direction independently of each other by a Z-axis moving unit provided in each workbench,
wherein a first work area (i) is provided in the first workbench and (ii) is a work area on which the predetermined job is performed by the first hand,
wherein a second work area is provided in the second workbench, the first work area and the second work area being independent of each other and a width of the first work area being larger than a width of the second work area,
wherein, when the second hand performs a job on the second work area, the first hand is positioned in a place in which the first hand does not come in contact with the second workbench.

2. The automated assembly apparatus according to claim 1, wherein the Y-axis moving unit is capable of moving the X-axis moving unit, and
wherein the first hand and the second hand are provided on the X-axis moving unit and disposed in parallel in the Y-axis direction.

3. The automated assembly apparatus according to claim 1, wherein the width of the first work area is a width of the first workbench, and
wherein the width of the second work area is a width of the second workbench.

4. The automated assembly apparatus according to claim 1, wherein the assembly robot does not have a drive unit in the Z-axis direction.

5. The automated assembly apparatus according to claim 1, wherein the first work area is a supply tray on which a plurality of assembly components are placed.

6. The automated assembly apparatus according to claim 1, wherein, when either the first hand is performing the predetermined job on the first work area or the second hand is performing the job on the second work area, the first hand and the second hand are disposed in a line with an order,
wherein the first work area and second work area are disposed in a line according to the order of disposition of the first and second hands.

7. An automated assembly apparatus, comprising:
an assembly robot having a first hand, a second hand, and a third hand, the first hand (i) being provided at a position lower than the second hand and the third hand in a Z-axis direction and (ii) being arranged to perform a predetermined job, the assembly robot being configured to integrally move the first hand, the second hand, and third hand in the X-axis direction and the Y-axis direction by an X-axis moving unit and a Y-axis moving unit; and
a first workbench, a second workbench and a third bench which are movable in the Z-axis direction independently of one another by a Z-axis moving unit provided in each workbench,
wherein a first work area (i) is provided in the first workbench and (ii) is a work area on which the predetermined job is performed by the first hand,
wherein a second work area is provided in the second workbench,
wherein a third work area is provided in the third workbench,
wherein the first work area, the second work area, and the third work area are independent of one another, a width of the first work area being (i) larger than a width of the second work area and (ii) larger than a width of the third work area,
wherein, when the second hand performs a job on the second work area or the third hand performs a job on the third work area, the first hand is positioned in a place in which the first hand does not come in contact with the second workbench and the third workbench.

8. The automated assembly apparatus according to claim 7, wherein each of the second hand and third hand has a clearance width, and the widths of the second work area and the third work area are smaller than at least one of the clearance widths of the second hand and third hand.

9. The automated assembly apparatus according to claim 8, wherein the second hand is (i) higher than the first hand and third hand in the Z-axis direction and (ii) disposed between the first hand and third hand in the Y-axis direction, and
wherein the widths of the second work area and the third work area are smaller than the clearance width of the second hand.

10. The automated assembly apparatus according to claim 7, wherein the Y-axis moving unit is capable of moving the X-axis moving unit,
wherein the first hand, the second hand, and the third hand are provided on the X-axis moving unit and disposed in parallel in the Y-axis direction, and
wherein the second hand and the third hand are disposed on one side of the first hand in the Y-axis direction.

11. The automated assembly apparatus according to claim 7, wherein the width of the first work area is a width of the first workbench, and
wherein the width of the second work area is a width of the second workbench.

12. The automated assembly apparatus according to claim 7, wherein the width of the third work area is a width of the third workbench.

13. The automated assembly apparatus according to claim 7, wherein the assembly robot does not have a drive unit in the Z-axis direction.

14. The automated assembly apparatus according to claim 7, wherein the first work area is a supply tray on which a plurality of assembly components are placed.

15. The automated assembly apparatus according to claim 7, wherein, when the first hand is performing the predetermined job on the first work area, the second hand is performing the job on the second work area, and the third hand is performing the job on the third work area, the first hand, the second hand, and the third hand are disposed in a line with an order,
wherein the first work area, the second work area, and the third work area are disposed in a line according to the order of disposition of the first, second, and third hands.

16. An automated assembly method comprising:
performing an assembly operation with an assembly robot, a first workbench, and a second workbench, the assembly operation including:
performing a predetermined job on a first work area of the first workbench with a first hand of the assembly robot, the assembly robot having the first hand and a second hand, the first hand being provided at a position lower than the second hand in a Z-axis direction;
preforming a job on a second work area of the second workbench with the second hand of the assembly robot, the first hand is positioned in a place in which the first hand does not come in contact with the second workbench when the second hand performs the job on the second work area, the first work area and the second work area being independent of each other and a width of the first work area being larger than a width of the second work area;
moving the first hand and the second hand, integrally, in an X-axis direction and a Y-axis direction above the first work area and the second work area by an X-axis moving unit and a Y-axis moving unit; and
moving the first workbench and the second workbench in the Z-axis direction, the first workbench and the second workbench being movable in a Z-axis direction independently of each other by a Z-axis moving unit provided in each workbench.

17. The automated assembly method according to claim 16, wherein the first work area is a supply tray on which a plurality of assembly components are placed.

18. The automated assembly method according to claim 17, wherein the assembly operation further includes:
grasping the assembly component on the supply tray by the first hand arranged to perform a job on the supply tray;
moving the assembly component above the second workbench on which a target component is placed by the X-axis moving unit and the Y-axis moving unit; and
moving the target component in the Z-axis direction after the grasping step and the moving step by the Z-axis moving unit provided in the second workbench to assemble the assembly component and the target component.

19. The automated assembly method according to claim 16, wherein the assembly operation is performed with a third workbench and the assembly operation further includes:
preforming a job on a third work area of the third workbench with a third hand of the assembly robot, the first hand being positioned in a place in which the first hand does not come in contact with the third workbench when the third hand performs a job on the third work area, the first hand being provided at a position lower than the third hand in the Z-axis direction, the third work area being independent of the first work area and the second work area, and the width of the first work area is larger than a width of the third work area;
moving the third hand integrally with the first hand and the second hand in an X-axis direction and a Y-axis direction above the first work area, the second work area, and the third work area by the X-axis moving unit and the Y-axis moving unit; and
moving the third workbench in the Z-axis direction, the third work bench being movable in a Z-axis direction independently of the first workbench and the second workbench by a Z-axis moving unit provided in the third workbench.

20. The automated assembly method according to claim 16, wherein the assembly robot does not have a drive unit in the Z-axis direction.

* * * * *